(12) United States Patent
Zheng et al.

(10) Patent No.: US 9,098,621 B2
(45) Date of Patent: Aug. 4, 2015

(54) MODELING SOFTWARE BEHAVIOR USING LEARNED PREDICATES

(75) Inventors: Alice X. Zheng, Seattle, WA (US); Madanlal S. Musuvathi, Seattle, WA (US); Nishant A. Mehta, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 595 days.

(21) Appl. No.: 13/037,325

(22) Filed: Feb. 28, 2011

(65) Prior Publication Data

US 2012/0222013 A1 Aug. 30, 2012

(51) Int. Cl.
G06F 9/44 (2006.01)
G06F 11/36 (2006.01)
G06F 15/18 (2006.01)

(52) U.S. Cl.
CPC ........ *G06F 11/3612* (2013.01); *G06F 11/3672* (2013.01); *G06F 15/18* (2013.01)

(58) Field of Classification Search
None
See application file for complete search history.

(56) References Cited

U.S. PATENT DOCUMENTS

| | | | |
|---|---|---|---|
| 6,353,883 B1 | 3/2002 | Grochowski et al. | |
| 7,058,925 B2 | 6/2006 | Ball et al. | |
| 7,278,135 B2 | 10/2007 | Czerwonka | |
| 7,483,824 B1 * | 1/2009 | Hill | 703/14 |
| 7,584,455 B2 | 9/2009 | Ball | |
| 7,587,707 B2 | 9/2009 | Ball et al. | |
| 8,620,921 B1 * | 12/2013 | Susarla et al. | 707/738 |
| 2001/0032068 A1 * | 10/2001 | Paterson et al. | 703/22 |
| 2003/0204834 A1 * | 10/2003 | Ball et al. | 717/106 |
| 2006/0282807 A1 | 12/2006 | Ivancic et al. | |
| 2008/0270088 A1 * | 10/2008 | Abe et al. | 703/2 |
| 2008/0282108 A1 * | 11/2008 | Jojic et al. | 714/26 |
| 2009/0007077 A1 | 1/2009 | Musuvathi et al. | |
| 2009/0228871 A1 * | 9/2009 | Edwards et al. | 717/128 |

OTHER PUBLICATIONS

Last et al. "The data mining approach to automated software testing." Proceedings of the ninth ACM SIGKDD international conference on Knowledge discovery and data mining. ACM, 2003.*
Margaria et al. "Efficient test-based model generation for legacy reactive systems." High-Level Design Validation and Test Workshop, 2004. Ninth IEEE International. IEEE, 2004.*
Lorenzoli, et al., "Automatic generation of software behavioral models", Retrieved at << http://ieeexplore.ieee.org/stamp/stamp.jsp?tp=&arnumber=4814161 >>, International Conference on Software Engineering, May 10-18, 2008, p. 501-510.

(Continued)

*Primary Examiner* — Chameli Das
*Assistant Examiner* — Joanne Macasiano
(74) *Attorney, Agent, or Firm* — Sandy Swain; Judy Yee; Micky Minhas

(57) ABSTRACT

The described implementations relate to analysis of computing programs. One implementation provides a technique that can include accessing values of input variables that are processed by test code and runtime values that are produced by the test code while processing the input variables. The technique can also include modeling relationships between the runtime values and the values of the input variables. The relationships can reflect discontinuous functions of the input variables.

20 Claims, 9 Drawing Sheets

METHOD 500

(56) References Cited

OTHER PUBLICATIONS

Liu, et al., "SOBER: statistical model based bug localization", Retrieved at << http://citeseerx.ist.psu.edu/viewdoc/download?doi=10.1.1.76.936&rep=rep1&type=pdf >>, Joint 10th European Software Engineering Conference (ESEC) and 13th ACM SIGSOFT Symposium on the Foundations of Software Engineering, Sep. 5-9, 2005, pp. 10.

Bryant, et al., "Verifying properties of hardware and software by predicate abstraction and model checking", Retrieved at << http://www.cs.cmu.edu/~bryant/pubdir/iccad04.pdf >>, The International Conference on Computer-Aided Design, Nov. 7-11, 2004, pp. 2.

Dodoo, et al., "Selecting, refining, and evaluating predicates for program analysis", Retrieved at << http://www.cs.washington.edu/homes/mernst/pubs/predicates-tr914.pdf >>, Jul. 21, 2003, p. 1-12.

Johnson, et al., "Analysis techniques for predicated code", Retrieved at << http://ieeexplore.ieee.org/stamp/stamp.jsp?tp=&arnumber=566454 >>, 29th Annual International Symposium on Microarchitecture, Dec. 2-4, 1996, p. 100-113.

Hannah, et al., "Dirichlet process mixtures of generalized linear models", Retrieved at << http://www.cs.princeton.edu/~blei/papers/HannahBleiPowell2010.pdf >>, Proceedings of the 13th International Conference on Artificial Intelligence and Statistics, vol. 9, 2010, pp. 8.

Muller, et al., "Bayesian clustering with regression", Retrieved at << http://www.mat.puc.cl/~quintana/bcwr.pdf >>, Retrieved Oct. 15, 2010, pp. 38.

Neal, Radford M., "Markov chain sampling methods for dirichlet process mixture models", Retrieved at << http://www-clmc.usc.edu/~cs599_ct/neal-TR1998.pdf >>, Technical Report No. 9815, Department of Statistics, Sep. 1, 1998, p. 1-17.

Dahl, David B., "An improved merge-split sampler for conjugate dirichlet process mixture models", Retrieved at << http://citeseerx.ist.psu.edu/viewdoc/download?doi=10.1.1.154.316&rep=rep1&type=pdf >>, Nov. 21, 2003, pp. 32.

Antoniak, "Mixtures of Dirichlet Processes With Application to Bayesian Nonparametric Problems", The Annals of Statistics, Nov. 1974.

Ernst et al., "The Daikon System for Dynamic Detection of Likely Invariants," Science of Computer Programming, vol. 69, Issues 1-3, Dec. 1, 2007, pp. 35-45.

Kim et al., "An Evaluation of Daikon: A Dynamic Invariant Detector," Retrieved from the University of Washington: https://www.cs.cmu.edu/~aldrich/courses/654-sp05/homework/example-tool-eval.pdf, 2004.

"The Daikon Invariant Detector User Manual," Retrieved at: <<http://web.stanford.edu/class/cs295/asgns/asgn3/daikon.html>>, Retrieved Date: Mar. 3, 2015.

Xiao, Chen, "Performance Enhancements for a Dynamic Invariant Detector" Masters Thesis, MIT Department of Electrical Engineering and Computer Science, Feb. 2007.

Perkins et al., "Efficient Incremental Algorithms for Dynamic Detection of Likely Invariants," In FSE 2004, Proceedings of the ACM SIGSOFT 12th Symposium on the Foundations of Software Engineering, Nov. 2-4, 2004, pp. 23-32.

Meghani et al., "Determining Legal Method Call Sequences in Object Interfaces," Retrieved at: <<http://homes.cs.washington.edu/~mernst/pubs/call-sequences.pdf>>, May 2003.

Ernst et al., "Dynamically Discovering Likely Program Invariants to Support Program Evolution," IEEE Transactions on Software Engineering, vol. 27, No. 2, Feb. 2001, pp. 99-123.

Ernst, Michael D., "Dynamically Discovering Likely Program Invariants," Ph.D. Dissertation, University of Washington Department of Computer Science and Engineering, Aug. 2000.

Ernst et al., "Quickly Detecting Relevant Program Invariants," in ICSE 2000, Proceedings of the 22nd International Conference on Software Engineering, Jun. 7-9, 2000, pp. 449-458.

Ernst et al., "Dynamically Discovering Pointer-Based Program Invariants," University of Washington Department of Computer Science and Engineering technical report UW-CSE-99-11-02, Nov. 16, 1999. Revised Mar. 17, 2000.

Godefroid, Patrice, "Software Model Checking Improving Security of a Billion Computers," University of Washington Seminar, Powerpoint, Nov. 2009.

Godefroid, Patrice, "From Blackbox Fuzzing to Whitebox Fuzzing Towards Verification," Presentation at the 2010 International Symposium on Software Testing and Analysis, Powerpoint, Jul. 12-16, 2010.

Godefroid et al., "Automated Whitebox Fuzz Testing," Technical Report MSR-TR-2007-58, Microsoft Research, May 2007.

Microsoft Research, "SAGE: Whitebox Fuzzing for Security Testing," Microsoft Techfest 2011 and in the R &D, Powerpoint, Mar. 2011.

\* cited by examiner

```
void func (int x1, int x2)                    301
{
        int t = x1 + 5;
        if (t < x1 + x2) {
                ...
        }
}
```

FIG. 3A

```
void func (int x1, int x2)          302
{
        int t;
        if (x1 > x2)
        {
                t = 2*x1;
        }
        else
        {
                t = 2*x2;
        }
        if (t < x1 + x2) {
                ...
        }
}
```

```
void func (int x1, int x2)          303
{
        int t = x1;
        int s;
        for (int i = 0; i < x1; i++)
                s += x1*i;
        if (t < x1 + x2) {
                ...
        }
}
```

FIG. 3B          FIG. 3C

```
void func1 (int x1, int x2)         701
{
        int t;
        if (x1 > x2)
        {
                t = x1;
        }
        else
        {
                t = x2;
        } if (x1 + x2 == 256) {
                ...
        }
}
```

FIG. 7

```
int func1 (int x1)                                901
{
        int index1 = x1 + 1;

int array1[256] = {0, 0, 0, .... 1};

int assign_val = 0;

assign_val = array1[index1 % 256];

return assign_val;

MODELING SOFTWARE BEHAVIOR USING LEARNED PREDICATES

BACKGROUND

Computer software programs can be analyzed to identify bugs, to verify correct operation of the programs, or to develop metrics that describe the programs. For example, programs can be manually analyzed at the source code level by individual programmers. Automated techniques for analyzing code also exist, and can be broadly categorized into two groups, static analysis and dynamic analysis.

Static analysis techniques evaluate code by using logical and symbolic techniques to reason about the behavior of the program on different inputs, without necessarily running the program. For example, static analysis can evaluate how program variables are modified in different ways when a program uses different control paths. In contrast, dynamic analysis techniques operate by executing the program with different test inputs to see how the program behaves for different inputs. For example, dynamic analysis techniques can evaluate runtime variables of a program across one or more program executions.

SUMMARY

This document relates to analysis of software programs. One implementation is manifested as a technique that can include accessing values of input variables that are processed by test code and runtime values that are produced by the test code while processing the input variables. The technique can also include modeling relationships between the runtime values and the values of the input variables. The relationships can reflect at least two discontinuous functions of the input variables.

Another implementation is manifested as a computer-readable storage media that can include instructions which, when executed by one or more processing devices, can perform accessing runtime values of a program predicate that are produced by test code at runtime. The runtime values can be produced by the test code while processing input variables. The instructions can also perform modeling relationships between the values of the program predicate and values of the input variables, and representing the relationships as at least two mathematical expressions that include an individual input variable.

Another implementation is manifested as a system that can include a fuzzing component configured to manipulate test inputs for a computer program. The system can also include a modeling component configured to learn a predicate representing a relationship between the test inputs and runtime values of the computer program. The system can also include a constraint solver configured to solve one or more constraints of the learned predicate.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIGS. 3A-3C, 7, and 9 show exemplary test code snippets in accordance with some implementations of the present concepts.

DETAILED DESCRIPTION

Overview

Figure 1:
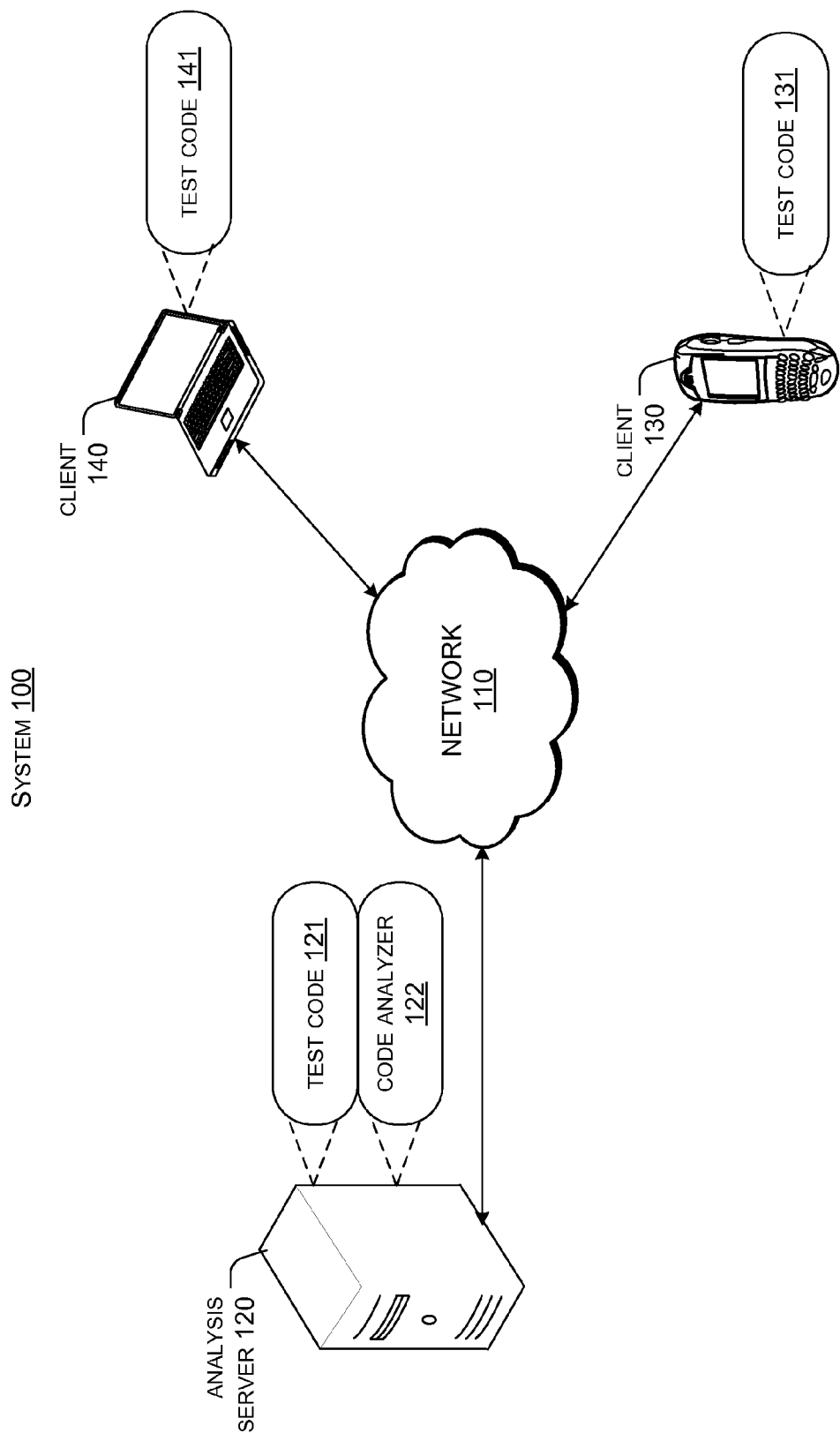
FIG. 1 shows an example of an operating environment in accordance with some implementations of the present concepts.

This document relates to analysis of computing programs, and more specifically to using modeling techniques to discover relationships between program input variables and runtime values such as values of intermediate variables, program predicates, or function return values. The document also relates to how the discovered relationships can be used to identify test inputs to the computer programs, e.g., using fuzzing or other testing techniques. The discovered relationships can be represented in predicate form, e.g., as a mathematical expression of one or more input variables. For the purposes of this document, a discovered relationship represented in predicate form is referred to as a "learned predicate."

The term "runtime value" refers to the state of a programmatic expression during execution of a program. For example, a function can return different values at runtime depending on the inputs to the function, e.g., by returning a positive integer when the function executes correctly and a negative value to indicate an error. Another example of a runtime value is the value an intermediate variable, which refers to a program variable that is not also an input to the program. Generally speaking, runtime values such as intermediate variables or function return values can vary depending on the inputs to the program.

Another example of a runtime value occurs when a program evaluates a predicate that appears in the code. For the purposes of this document, the term "program predicate" refers to a predicate that exists in a computer program being analyzed, e.g., as one or more lines of code. In contrast, the term "learned predicate" refers to a representation of a relationship, discovered using the disclosed techniques, between values of one or more input variables and one or more runtime values. A program predicate is another example of a runtime value, like intermediate variables and function return values.

Program predicates are generally program-defined relationships between one or more variables or constants. Program predicates can evaluate at runtime to certain values, such as numerical values, true, false, etc. One example of a program predicate is the condition ("branch predicate") of a branch conditional statement, e.g., the condition of an "if" statement in a programming language such as C, C++, or Java™. The value of program predicates can vary at runtime depending on the values of input variables to the program. Moreover, different control paths can be taken within the program depending on the runtime values of one or more program predicates, e.g., an "if" statement generally includes a path that is only taken when the program predicate evaluates to "true" at runtime. The program can also include a corresponding "else" statement with a second path that is only taken when the program predicate evaluates to "false" at runtime.

Because of the relative complexity of many software programs, relationships between input variables and runtime values may not be apparent to programmers or readily discoverable using traditional static or dynamic analysis techniques. For example, in some cases, each control path of a program may exhibit different behaviors, e.g., the value of a particular program predicate or intermediate variable may be a different function of a particular input variable depending on which path or paths are taken at runtime by the program. In other cases, several different control paths of a program may exhibit similar behavior, e.g., the value of the program predicate or intermediate variable can be explained using a single function of the input variables regardless of which path or paths is taken in the program code at runtime. Using the techniques discussed herein, the behavior of a given runtime value can be represented as a learned predicate, i.e., a mathematical expression that includes one or more of the input variables.

For purposes of explanation, consider introductory FIG. 1. FIG. 1 shows an exemplary system 100 that is consistent with the disclosed implementations. As shown in FIG. 1, system 100 includes a network 110 connecting numerous devices, such as an analysis server 120 and client devices 130 and 140. As discussed in more detail below, each device shown in FIG. 1 can include one or more processing devices, such as computer processors, executing instructions stored on one or more computer-readable storage media devices such as a volatile or non-volatile memory, optical disk, hard drive, flash drive, etc.

Analysis server 120 can host test code 121, e.g., a computing program or software module that processes one or more test inputs. In some implementations, test code 121 can be instrumented so that runtime values are recorded when test code 121 is processing the test inputs. Analysis server 120 can also host code analyzer 122, which is configured to analyze test code 121. Generally speaking, code analyzer 122 can be configured to access the test inputs and the recorded runtime values to discover one or more relationships between the test inputs and the runtime values. As mentioned above, the discovered relationships can be represented in the form of a predicate, and are referred to herein as learned predicates.

Client devices 130 and 140 can host test code 131 and 141, respectively, which can be processed similarly to test code 121. For example, test code 121, 131, and 141 can be a single application that is installed on all three devices 120, 130, and 140, or can be different applications and/or versions of an application. In some implementations, test code 121, 131, and/or 141 is a software module that is part of a larger application. Client devices 130 and/or 140 can be configured to send recorded runtime values for test code 131 and 141, respectively, to analysis server 120. Code analyzer 122 can be configured to analyze test code 131 and/or 141 as discussed herein with respect to test code 121, and send results of the analysis back to client devices 130 and/or 140. Thus, code analyzer 122 is not necessarily hosted on the same device as the code that is being analyzed. Rather, code analyzer 122 can operate remotely from the code that is being analyzed.

Figure 2:
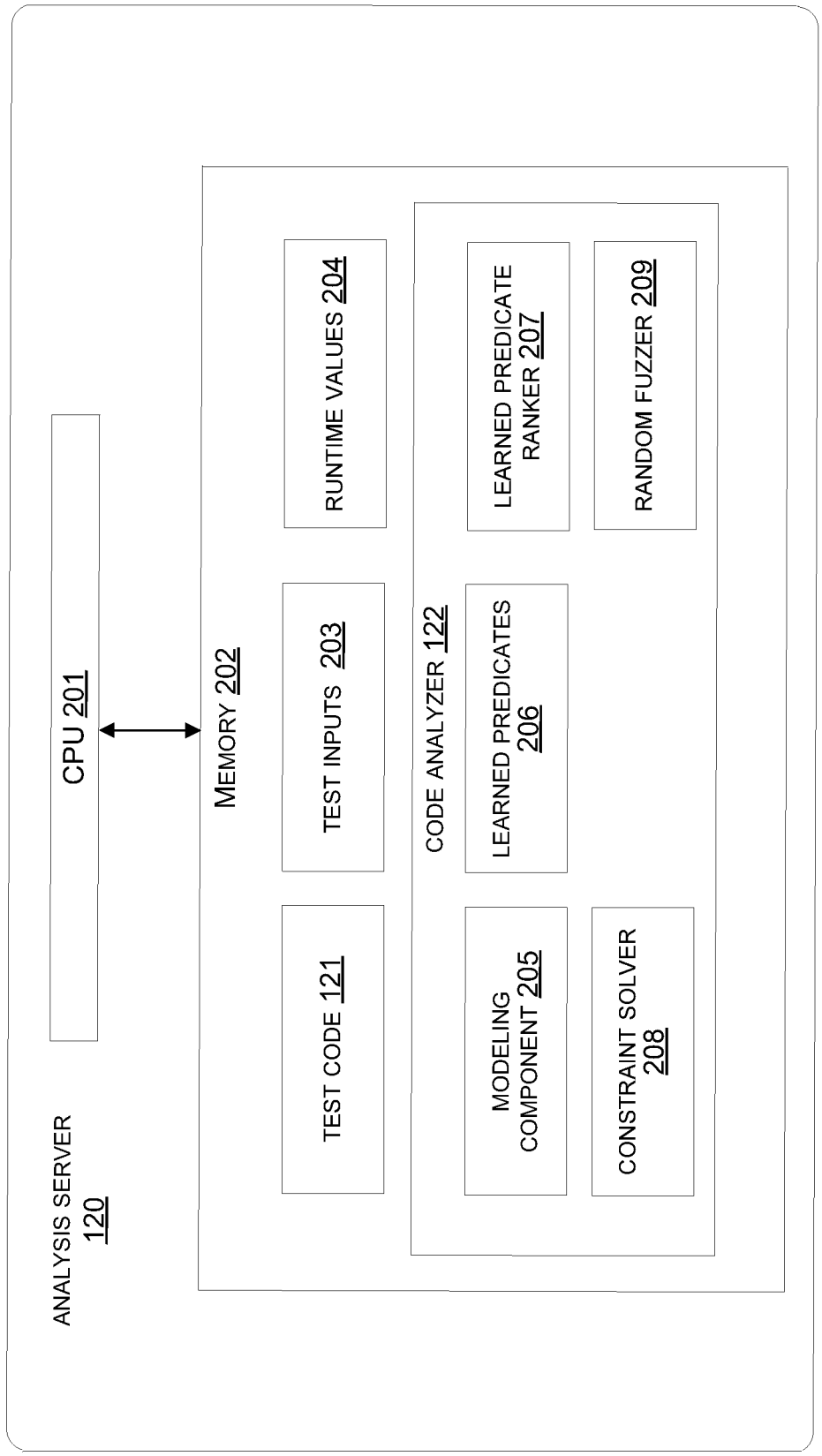
FIG. 2 shows exemplary components of a device in accordance with some implementations of the present concepts.

FIG. 2 shows an exemplary architecture of analysis server 120 that is configured to accomplish the concepts described above and below. Analysis server 120 can include a central processing unit ("CPU") 201 that is operably connected to a memory 202. For example, CPU 201 can be a reduced instruction set computing (RISC) or complex instruction set computing (CISC) microprocessor that is connected to memory 202 via a bus. Memory 202 can be a volatile storage device such as a random access memory (RAM), or a non-volatile memory such as FLASH memory. Although not shown in FIG. 2, analysis server 120 can also include various input/output devices, e.g., a keyboard, a mouse, a display, a printer, etc. Furthermore, analysis server 120 can include one or more non-volatile storage devices, such as a hard disc drive (HDD), optical (compact disc/digital video disc) drive, tape drive, etc. Generally speaking, any data processed by analysis server 120 can be stored in memory 202, and can also be committed to non-volatile storage.

Memory 202 of analysis server 120 can include various components that implement certain processing described herein. For example, memory 202 can include test code 121, code analyzer 122, test inputs 203, and runtime values 204. Code analyzer 122 can include subcomponents such as a modeling component 205, which can produce learned predicates 206. Code analyzer 122 can also include a learned predicate ranker 207, a constraint solver 208, and a random fuzzer 209. Generally speaking, components 203, 204, and 206 comprise data, and components 121, 122, 205, and 207-209 can include instructions stored in memory 202 that can be read and executed by central processing unit (CPU) 201. Components 121, 122, and 203-209 can also be stored in non-volatile storage and retrieved to memory 202 to implement the processing described herein.

Test inputs 203 can include one or more input variables that can be processed by test code 121. For example, test inputs 203 can be generated randomly by random fuzzer 209 or by constraint solver 208, and are processed by test code 121 to produce one or more outputs. Test code 121 can be instrumented so that runtime values 204 are recorded while test code 121 is processing test inputs 203. Runtime values 204 can include values of intermediate variables, program predicates, function return values, etc.

Modeling component 205 can be configured to train a model based on test inputs 203 and recorded runtime values 204. Generally speaking, modeling component 205 can use various machine learning or statistical techniques to learn relationships between test inputs 203 and runtime values 204. For example, modeling component 205 can implement neural networks, clustering, Bayesian or other probabilistic models, etc. In the specific implementations discussed below, nonparametric Bayesian modeling of mixtures of conditional linear Gaussians is discussed as one technique that can be used to model the predicate values as a mixture of linear surfaces of one or more input variables taken from test inputs 203. Modeling component 205 can output the learned relationships in predicate form, shown in FIG. 2 as learned predicates 206.

In some implementations, modeling component 205 can produce a large number of learned predicates 206. Learned predicates 206 can be ranked by learned predicate ranker 207 based on various criteria discussed in more detail below. Constraint solver 208 can be configured to produce test inputs that are targeted to cause the learned predicates to evaluate to a particular value in subsequent executions of test code 121. In some implementations, constraint solver 208 solves constraints for learned predicates 206 in the order produced by learned predicate ranker 207. The solutions produced by constraint solver 208 can be used as directly as new test inputs 203 for continued analysis of test code 121, or they can manipulated by random fuzzer 209 before being used as new test inputs 203. In some implementations, random fuzzer 209 generates an initial set of test inputs 203 using randomization techniques. Thereafter, random fuzzer 209 can update test inputs 203 by applying randomization techniques to the outputs of constraint solver 208.

The following is a general description of the interactions of components 205-209 of code analyzer 122. As mentioned, modeling component 205 can output a first set of learned predicates 206 by analyzing a first set of runtime values 204 output by test code 121 and a corresponding first set of test inputs 203. For this first set of test inputs 203, a particular branch predicate in test code 121 may always evaluate to "true." Thus, any code that is conditioned on a "false" evaluation of the branch predicate is not exercised by this first set of test inputs.

This relationship between the first set of test inputs 203 and the first set of runtime values 204 can be learned by modeling component 205 and represented as an individual learned predicate 206. Next, constraint solver 208 can solve constraints for this learned predicate by generating a second set of test inputs 203 that will direct test code 121 into one of the previously unexplored branches. As an example, constraint solver 208 can generate a set of test inputs that will cause the branch predicate to evaluate to "false" at runtime.

In this manner, code analyzer 122 can be applied iteratively to update test inputs 203 and in turn revise or update modeling component 205 to learn more predicates. In some implementations, this iterative process is entirely automated. However, as discussed below, users such as programmers can also guide code analyzer 122 to help ensure appropriate coverage of any or all program predicates and/or related control paths in test code 121.

Note that code analyzer 122 is described below with respect to implementations on analysis server 120. However, code analyzer 122 can be embodied on various types of devices. For example, code analyzer 122 can be embodied on a personal computer (PC), laptop, cell phone, personal digital assistant (PDA), etc. Furthermore, the functionality described herein with respect to code analyzer 122 can be distributed across multiple devices.

The following illustrates further examples of how code analyzer 122 can work. FIGS. 3A, 3B, and 3C illustrate exemplary code snippets 301, 302, and 303. Code snippets 301, 302, and 303 generally show source code such as may be found in any of test code 121, 131, and/or 141. For example, code snippets 301, 302, and/or 303 can be compiled and, in some implementations, linked into executable binaries suitable for execution by analysis server 120, client device 130, and/or client device 140. In other implementations, code snippets 301, 302, and/or 303 can be interpreted or processed by a just-in-time compiler.

Code snippet 301 includes a branch predicate (t<x1+x2), which is a condition for entering the "if" statement shown in FIG. 3A. The branch involves comparing the value of the expression (t−(x1+x2)) to zero. At runtime, code snippet 301 evaluates the expression (t−(x1+x2)), and this value (the "predicate value") can be stored in runtime values 204. When (t−(x1+x2))<0, the branch predicate evaluates to "true" and the "if" statement is entered. In contrast, when (t−(x1+x2))>=0, the branch predicate evaluates to "false," and the "if" statement is not entered. In either case, the runtime true or false values for the branch predicate can also be stored in runtime values 204. Note that, by substituting the value "x1+5" for t in the branch predicate, the branch predicate becomes (x1+5)<(x1+x2), or, equivalently, (5<x2).

As discussed in more detail below, code analyzer 122 can learn this relationship, (5<x2), without analyzing the symbolic relationship between t and x1. Moreover, the relationship can be represented as an expression (5<x2) that includes the input variable x2 but does not include the intermediate variable t. For complex branch predicates, the relationship between the runtime value of the branch predicate and the input variables may be quite complex. The runtime value of the branch predicate might depend on the exact path taken from the beginning of the program execution to the branch predicate, the particular variables of numerous intermediate variables, etc. However, the relationship can often be represented in simpler form as an expression of one or more intermediate variables.

For the following discussion, x denotes a vector of program input variables such as can be included in test inputs 203. Furthermore, y denotes the value of a runtime value such as a program predicate, an intermediate variable, etc. In the example of code snippet 301, x is a vector such as {x1, x2} and y is the runtime value of the branch predicate (t−(x1+x2)). Generally speaking, code analyzer 122 can be configured to learn relationships of the form y=f(x), for example using modeling, machine learning, or other techniques. In the example of FIG. 3A, the value of y depends on the input variables x1 and x2, as well the intermediate program variable t. Here, t has a simple linear relationship with x1, which can be seen from the source code. Therefore, the value of y has a simple linear relationship with the values of the input variables. In general, however, runtime values may have an arbitrary number of relationships with one or more input variables, which can be made more complicated by the code paths that are executed before the runtime values are evaluated by test code 121.

FIG. 3B shows code snippet 302, which includes an "if-else" statement. Code snippet 302 shows an example where the value of y is (x1−x2) in the first "if" statement or (x2−x1) in the "else" statement. In the first "if" statement, if (x1−x2) is greater than zero, the "if" statement is entered, and otherwise, the "else" statement is entered. Thus, the first "if" statement defines two different control paths in the program that can be taken, depending on the values of input variables x1 and x2. Note also that y can be written more concisely as abs(x1−x2), which can be represented as a union of two linear surfaces.

Figure 4:
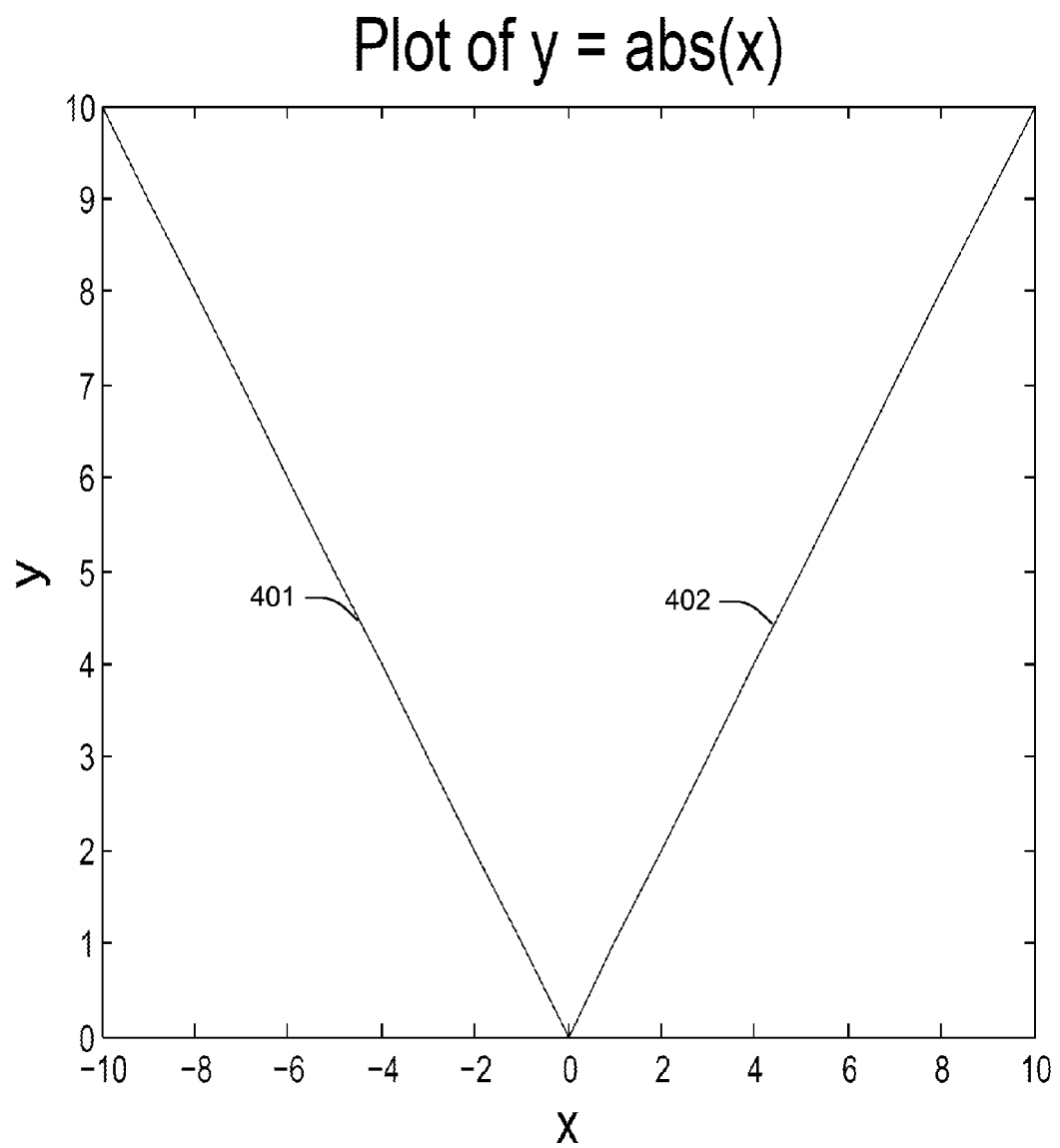
FIGS. 4 and 6 show exemplary graphical user interfaces that can be presented in accordance with some implementations of the present concepts.

In some implementations, modeling component 205 can model relationships between x and y, and can also plot the modeled surfaces on a graph. For example, a 3-D surface plot of the values of y, x1, and x2 would reveal that y is a combination of two linear functions, x1−x2 and x2−x1, joining at the diagonal line of x1=x2. FIG. 4 illustrates a graphical interface that shows a plot of the 2-dimensional version of the abs function with a single input variable x, i.e., y=abs(x). Linear surface 401 represents values of y for x<=0, and linear surface 402 represents values of y for x>=0.

As mentioned above, code snippet 302 includes an "if-else" statement with two different paths. Each path corresponds to a different behavioral mode of the code, and y maps precisely to the different code paths. However, this need not be true in general. There may be a large number of different paths leading to y, but not every path necessarily engenders a new behavioral mode, and indeed some paths may not affect the value of y at all. Code snippet 303, shown in FIG. 3C, illustrates such a scenario. In code snippet 303, the value of y=t−(x1+x2) is not affected by the intermediate loop which sets the value of intermediate variable s. There may be a large number of possible paths to reach y, one for each possible value of x1. However, each of these paths lead to the same behavioral mode of y, namely, y=−x2.

Figure 5:
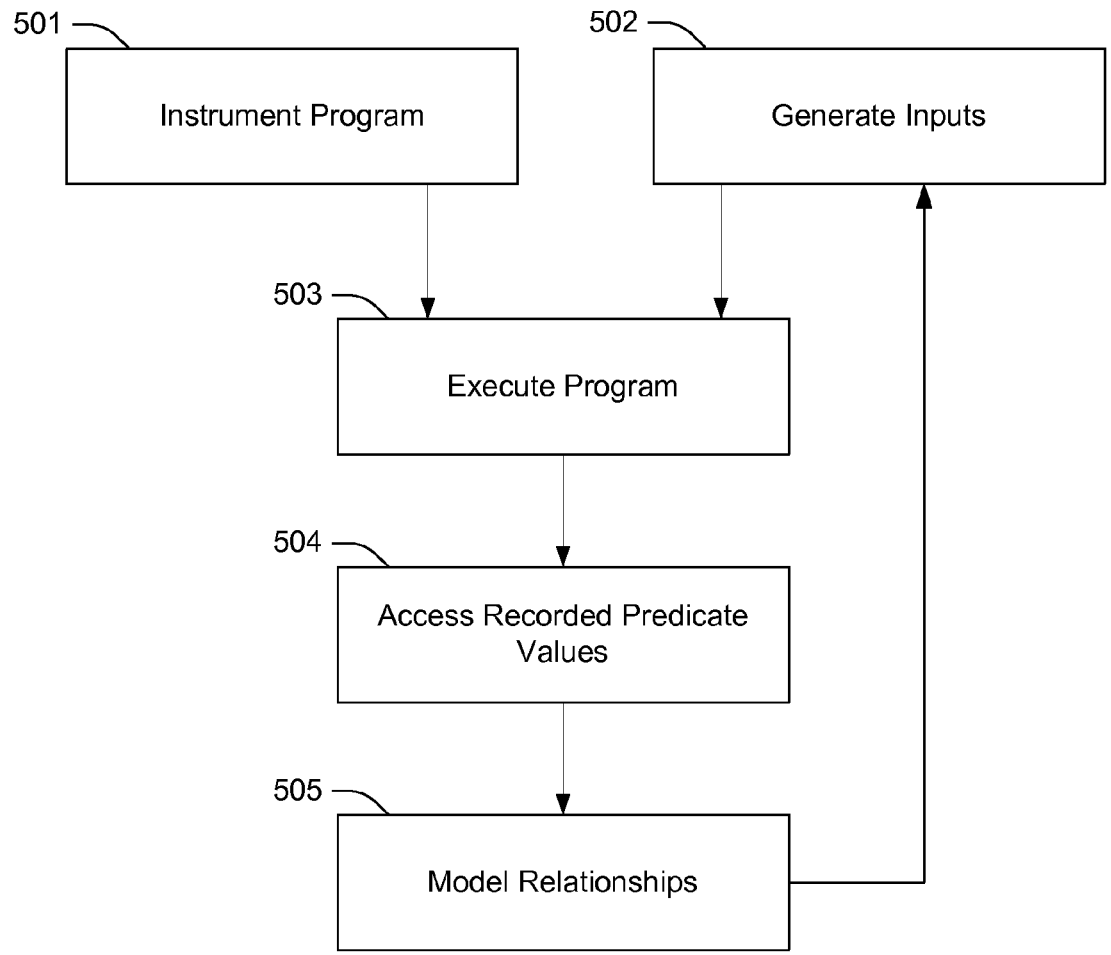
FIGS. 5 and 8 show flowcharts of exemplary methods that can be accomplished in accordance with some implementations of the present concepts.

FIG. 5 illustrates a method 500 that is suitable for implementation in system 100 or other systems. Analysis server 120 can implement method 500, as discussed below. Note that method 500 is discussed herein as being implemented on analysis server 120 for exemplary purposes, but is suitable for implementation on many different types of devices.

A program can be instrumented at block 501. For example, test code 121 can be in a binary format that is rewritten by analysis server 120 to log runtime values such as values of program predicates, intermediate variables, program output, and/or function return values during one or more executions of test code 121. In other implementations, test code 121 can be instrumented during compilation of the binary format, e.g., using a compiler flag or other indication that the binary should be instrumented. In still further implementations, test code 121 can be instrumented manually, e.g., by including source code or other instructions to log runtime values to one or more files.

Test inputs 203 can be generated at block 502 for subsequent execution by test code 121. Initial test inputs 203 can be generated manually, by random fuzzer 209, or using other test input generators. In addition, as discussed in more detail below, constraint solver 208 can generate test inputs 203 that are targeted to exercise certain control paths of test code 121. Note that the format of test inputs 203 can vary depending on how test code 121 reads inputs. For example, test inputs 203 can be stored as one or more files that are readable by test code 121, or can be provided at runtime as one or more variables such as primitive data types (integers, characters, floating point, etc.) or more complex data structures that include multiple instances of primitive data types (arrays, lists, structures, classes, etc.).

The instrumented program can be executed at block 503. For example, test code 121 can be executed one or more times using test inputs 203. As discussed, test code 121 can be instrumented so that runtime values 204 are recorded at runtime. Also note that test code 121 can be executed more than one time at block 503 using several sets of test inputs 203 before moving to block 504.

The recorded values can be accessed at block 504. For example, code analyzer 122 can access the recorded runtime values 504 of the program predicates, intermediate variables, etc. that are produced at block 503. Code analyzer 122 can also access test inputs 203 at this time.

Relationships between test inputs and runtime values can be modeled at block 505. For example, modeling component 205 of code analyzer 122 can model relationships between test inputs 203 and runtime values 204 that are accessed at block 504. Modeling component 205 can analyze each runtime value separately from the others. For example, modeling component 205 can analyze any or all program predicates, intermediate variables, etc. in test code 121 individually.

Consider a single program predicate that exhibits various behavior modes depending on the value of test inputs 203. Note, however, that test inputs 203 may include values for a plurality of input variables, and the different behavior modes may not depend on all of the input variables. For example, as discussed above with respect to FIG. 3A, when the input variable x2 is greater than 5 the program predicate (t<x1+x2) evaluates to "true." Thus, note that different values of x1 from test inputs 203 have no effect on the value of the program predicate. In contrast, different values of x2 from test inputs 203 are determinative of the value of the program predicate, e.g., depending on whether x2 is greater than 5. Thus, test code 121, and more particularly the program predicate, can be said to have two different behavior modes that are dependent on input variable x2, and independent of input variable x1. Modeling component 204 can learn these relationships between input variables and behavior modes at block 505.

Note that block 505 can include both identifying new relationships between input variables and runtime values as well as refining previously-identified relationships. As an example of how a new relationship can be identified, consider the following. Assume test code 121 includes code snippet 302. Furthermore, assume that test inputs 203 included only examples where (x1>x2). Thus, note that the "else" statement in code snippet 302 would not be executed by test code 121 under these circumstances. In some implementations, code analyzer 122 can create new values of x1 and x2 for test inputs 203 that are targeted to exercise the "else" statement of code snippet 302. In this manner, method 500 can be iteratively performed until test code 121 is fully analyzed or is otherwise deemed to have been sufficiently analyzed.

Using the techniques discussed herein, relationships between input variables and runtime values can be deduced using automated techniques. Moreover, complex relationships between the input variables and distinct control paths and/or intermediate variables that are not being analyzed can be ignored (i.e., not considered) even though these different control paths and intermediate variable values may map to individual behavior modes. Thus, an entire program (e.g., test code 121) can be modeled as a system of inputs and runtime values for the program predicates, intermediate variables, functions, etc. that are being analyzed. This is in contrast to static techniques which attempt to analyze each control path in an application, or dynamic techniques which may analyze relationships between different intermediate variables instead of tracing back to the impact of input values.

Figure 6:
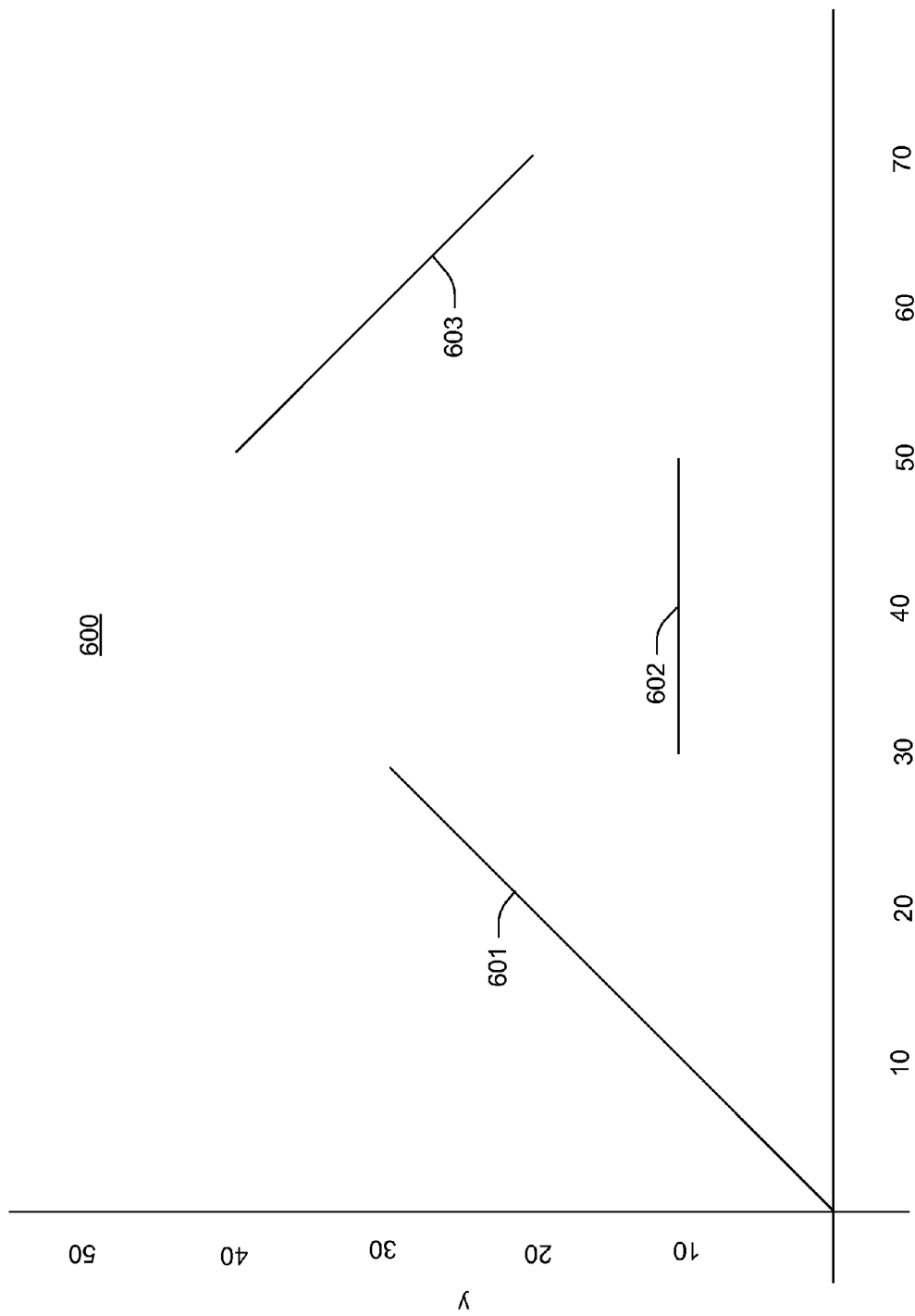

As mentioned above with respect to FIG. 4, code analyzer 122 can also output various graphical representations of one or more discovered behavior modes of test code 121. FIG. 6 illustrates an exemplary graphical interface 600, which includes three behavior modes 601, 602, and 603 illustrated graphically. Interface 600 includes a horizontal axis representing an input variable x1 and a vertical axis representing a runtime value y. Graphical interface 600 can be displayed on analysis server 120, or, in some instances, transmitted to client device 130 and/or 140 for display thereon.

Note that each behavior mode shown on graphical interface 600 can be a function of input variable x1. As shown in FIG. 6, behavior mode 601 generally represents a scenario where the runtime value of y is equal to input variable x1 for values of x1 ranging between 0 and 30. Behavior mode 602 generally represents a scenario where the runtime value of y is equal to 10 for values of input variable x1 ranging between 30 and 50. Behavior mode 603 generally represents a scenario where the runtime value of y decreases as input variable x1 increases for values of x1 ranging between 50 and 70. Thus, each behavior mode shown in FIG. 6 represents a corresponding function of the input variables. Moreover, the functions can be discontinuous.

Note that the behavior modes shown in FIG. 6 are for purposes of illustration, and code analyzer 122 can be configured to determine any number of relationships between input variables and predicates. Moreover, while the behavior modes shown in FIG. 6 are disjointed, code analyzer 122 can also determine continuous relationships. In addition, the number of behavior modes can be fixed or dynamic. In embodiments where the number of behavior modes is dynamic, the number of behavior modes can change as new predicates are learned by modeling component 205.

Generally speaking, different behavior modes can correspond to different control paths in test code 121. However, this does not necessarily imply that each code path in test code 121 has a corresponding behavior mode. Rather, in some cases, multiple code paths can map to a single behavior mode, as mentioned above with respect to FIG. 3C. For example, suppose two different code paths result in y having the same value as input variable x1. This behavior can be discovered using method 500 as set forth above, which can discover this behavior mode regardless of how many code paths map to the behavior mode. In contrast, many static analysis techniques would simply classify the different code paths as different program behaviors.

As mentioned, code analyzer 122 does not necessarily need to be preconfigured with the number of behavior modes. Rather, the number of behavior modes for a particular runtime value can be discovered dynamically, by executing test code 121 one or more times on various test inputs 203. In short, the number of behavior modes for a given runtime value can be determined by observing test code 121 over a range of test inputs 203. This can be particularly useful given that some programs may behave similarly on relatively large classes of inputs, e.g., FIG. 6 illustrates three classes of input variable x1, a first class between 0 and 30, a second class between 30 and 50, and a third class between 50 and 70. Moreover, code analyzer 122 is able to infer disjunctive relationships between these classes and the value of y regardless of the number of control paths that can cause the observed behaviors.

A Specific Modeling Algorithm

As discussed above, modeling component 205 of code analyzer 122 can model the relationships between y and one or more input variables using various machine learning and/or statistical techniques. In one particular implementation, modeling component 205 models y as a mixture of linear surfaces of one or more input variables x1, x2, etc. The actual relationship between the input variables and y may be very complicated. However, in many cases, a large number of relationships are simple enough to be modeled this way, even in circumstances where the relationships are not apparent from the code itself. Mathematically, such a model can be written as:

$$y = \Sigma_{i=1 \ldots k} \phi_i(x) \beta_i^T x + \epsilon,$$

where $\phi_i(x)$ is a mixture weight that may depend on the value of x, $\beta_i$ is the vector of linear coefficients representing the normal vector to the i-th linear surface. $\epsilon$ can be taken to be a noise term with a Gaussian distribution.

The number of mixture components can be k, which is often set to a fixed guess. In some implementations, k is automatically inferred from data. Suppose test code 121 is executed n times, and the values of input variables x1, x2, etc. and y are recorded for each execution. Let the generated test inputs 203 and corresponding runtime values 20 be $D = \{(x_1, y_1), (x_2, y_2), \ldots, (x_n, y_n)\}$. Modeling component 205 can model the probability of observing a set of y values as follows.

$$P(y_1, \ldots, y_n | x_1, \ldots x_n, \beta_1, \ldots, \beta_n) = \Pi_{i=1}^{n} \mathcal{N}(\beta V_i^T x_i, \sigma^2),$$

$$P(\beta_1, \ldots, \beta_n) = DP(\alpha \mathbb{G}_0),$$

$$\mathbb{G}_0 = \mathcal{N}(0, v^2 I).$$

In such implementations, the model can assume that the runtime value y's are normally distributed around a linear surface of the input variable x's. The coefficients of the linear surfaces $\beta_i$ can be generated from $DP(\alpha \mathbb{G}_0)$, a Dirichlet Process with base measure $\mathbb{G}_0$. In some implementations, $\mathbb{G}_0$ can be designated as a zero-meaned Gaussian. In notation, each $x_i$ is allowed to have its own linear surface, described by $\beta_i$. However, the Dirichlet Process can generate repeated values, which means that many of the $\beta_i$'s may in fact have the same value. Thus, the resulting model may include many fewer distinct linear surfaces than n. More precisely, the probability of $\beta_n$ conditioned on the previous $-1$ $\beta$'s under the Dirichlet Process can be represented as:

$$P(\beta_n | \beta_1, \ldots, \beta_{n-1}) \propto \alpha \mathbb{G}_0 + \Sigma_{i=1}^{n-1} \delta_{\beta_i}.$$

Given the model and the data, modeling component 205 can infer the likely values of $\beta_i$. Considering FIG. 6, the values of $\beta_i$ can converge so that, for values of x1 between 0 and 30, the line representing behavior mode 601 is weighted relatively heavily in comparison to the lines representing behavior modes 602 and 603. Similarly, the values of can converge so that the line representing behavior mode 602 is weighted heavily for values of x1 between 30 and 50, and line representing behavior mode 603 is weighted heavily for values of x1 between 50 and 70.

Note that, in some implementations, the parameters $\sigma$ and v are fixed. In general, however, the model introduced above can be extended and $\sigma$ and v can be sampled from a hyper prior distribution. This can be done via Markov chain Monte Carlo sampling, among other techniques. Considering FIG. 6, the values of x1 generally correspond to three groups, i.e., (0-30), (30-50), and (50-70). Because modeling component 205 considers different ranges and numbers of groupings for input variables, arbitrary numbers of input groups and behavior modes can be uncovered via the modeling. This, in turn, is possible because the model uses multiple linear surfaces to represent the individual behavior modes.

Applications

The techniques described above can also be extended to complement test input generation tools such as random fuzzer 209. This can be useful for identifying relationships that may exhibit a relatively low likelihood of being identified by purely random inputs. FIG. 7 illustrates an exemplary code snippet 701 that can have such characteristics.

Note that the first "if" statement in code snippet 701 is entered whenever x1 is greater than x2. Thus, the first "if" statement will be taken with probability 50% when choosing test inputs 121 randomly from a uniform distribution, and such inputs are likely to be sufficient for testing of the program predicate (x1>x2) and the code within the first "if" statement (t=x1). Likewise, the code in the "else" statement (t=x2) is also taken with probability of 50%, and thus is also likely to be sufficiently exercised by uniform random generation of test inputs 203.

Note, however, that the branch predicate for the second "if" statement, (x1+x2==256), is relatively unlikely to be true. This is because the probability of (x1+x2==256) is 1/(2^64), assuming 32 bits for x1 and x2. Moreover, the code represented by the ellipses ( . . . ) is unlikely to be exercised by uniform random test inputs over the range of possible values for x1 and x2. For the purposes of this document, branch predicates that are difficult to satisfy using random input generation are termed "funnel predicates." Specifically, a funnel predicate can be a predicate that, given uniform random inputs, is taken with a probability below a set threshold, e.g., 10%, 5%, etc.

Generally speaking, code analyzer 122 can be configured to provide coverage of funnel predicates and control paths that are taken conditionally based on the funnel predicates. In particular, code analyzer 122 can be configured to analyze branch predicates in test code 121 that are evaluated at runtime but infrequently or never taken. These branch predicates be exercised by generating test inputs that cause the branch predicates to evaluate to true at runtime. This, in turn, can cause the corresponding control paths to be taken. Thus, new relationships for runtime values in the control path of the funnel predicate can be learned that otherwise may not have been reached often or at all by purely random inputs.

Figure 8:
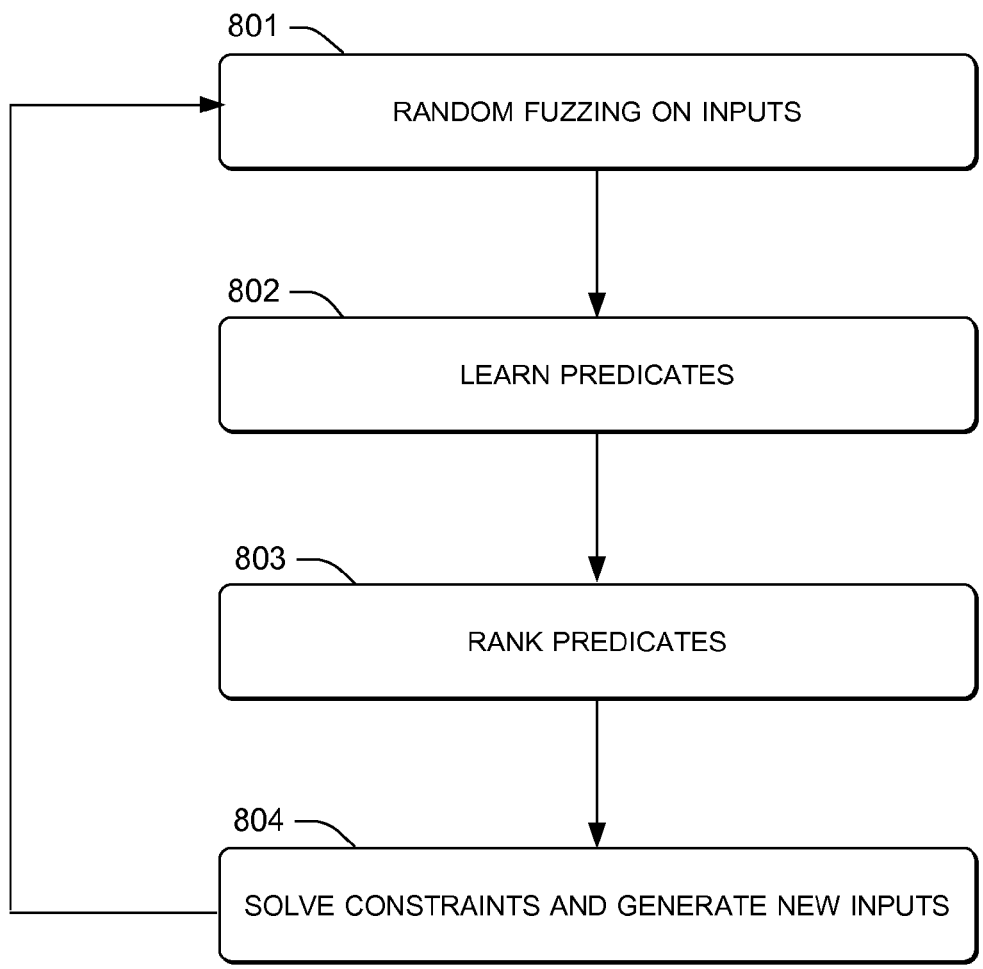

FIG. 8 illustrates a method 800 that is suitable for implementation in system 100 or other systems. Analysis server 120 can implement method 800, as discussed below. Note that method 800 is discussed herein as being implemented on analysis server 120 for exemplary purposes, but is suitable for implementation on many different types of devices.

Random fuzzing can be performed on inputs at block 801. For example, random fuzzer 209 can generate or manipulate one or more of test inputs 203. In some implementations, random fuzzer 209 can implement purely random mutations or other alterations of previous versions of test inputs 203. In other embodiments, random fuzzer 209 can implement techniques such as heuristically-guided or exploratory fuzzing at block 801 to fuzz test inputs 203.

Next, predicates can be learned at block 802. For example, code analyzer 122 can perform processing such as that discussed above with respect to block 505 of method 500. The relationships discovered by modeling component 205 can be represented in predicate form. For example, behavior mode 601 of FIG. 6 can be represented as $(y=x1)$, behavior mode 602 can be represented as $(y=10)$, and behavior mode 603 can be represented as $(y=90-x1)$.

In some implementations, newly learned predicates will correspond to program predicates that have not previously evaluated to "true" frequently or at all, e.g., funnel predicates. As mentioned above, the control path represented by the ellipses in code snippet 701 is unlikely to have been taken very frequently from purely random input data. Thus, given a random set of test inputs 203, it is likely that runtime values 204 will predominantly reflect values of "false" for the funnel predicate $(x1+x2==256)$.

Next, the learned predicates can be ranked at block 803. For example, learned predicate ranker 207 can rank the learned predicates using various heuristics to determine which of the learned predicates are most important. For example, the learned predicates can be ranked so that individual predicates with the most funneling behavior are ranked more highly than individual predicates that do not exhibit as much funneling behavior. In other words, a first branch predicate may always or nearly always evaluate to a particular runtime value, e.g., true or false, whereas a second branch predicate may exhibit a more equal distribution between true and false runtime values. In this case, a learned predicate corresponding to the first branch predicate may be ranked more highly than a learned predicate corresponding to the second branch predicate.

Next, constraints can be solved for the ranked predicates at block 804. For example, constraint solver 208 can solve certain constraints defined by the learned predicates, e.g., a constraint that $(x1+x2==256)$. Constraint solver 208 could generate values of x1 and x2 as pairs that add up to 256, e.g., (128, 128), (1, 255), (100, 156), etc. Note that these test inputs are much more likely to result in exercising the funnel predicate than would be the case for randomly-generated values across, e.g., a uniform distribution.

These values of the input variables can then be used to iteratively execute method 800. For example, block 801 can be performed again, and random fuzzing can be performed on the inputs generated at block 804. Random fuzzer 209 can generate random values for unconstrained input variables. For instance, random fuzzer 209 can take the pairs (128, 128), (1, 255), (100, 156), which specify only the values of x1 and x2, and augment them with randomly generated values for other input variables, e.g., x3, x4, . . . . These new fuzzy input variables can then be fed into further iterations of method 800, e.g., by continuing with blocks 802-804, fuzzing the inputs generated at block 804, and so on.

Furthermore, note that the fuzzy input variables generated the second time block 801 is performed are much more likely to exercise other control paths in the code that are conditional on the funnel predicate. This is because satisfying the funnel predicate may open up previously untraversed control paths.

This, in turn, can result in identifying new runtime values for program predicates and intermediate variables and, potentially, new funnel predicates. For example, assume the code in ellipses includes an "if" statement with a branch predicate such as [(x1 mod 2==0) AND x2 mod 2==0)]. In other words, the branch predicate requires that x1 and x2 are both even to be true. This relationship would ordinarily be satisfied approximately 25% of the time by purely random inputs. However, because this code is within the control path that is conditioned on the variables x1 and x2 having a sum of 256, this funnel predicate is unlikely to be reached frequently until the constraint-solving step has generated inputs that sum to 256. In some implementations, method 800 can be performed with user supervision to help identify the funnel predicates, e.g., branch predicates that the user knows are difficult to satisfy.

In the example discussed above, the branch predicate $(x1+x2==256)$ was learned by modeling component 205. In FIG. 7, the branch predicate $(x1+x2==256)$ is a function of the input variables x1 and x2, so the learned predicate corresponds directly to the branch predicate appearing in code snippet 701.

FIG. 9 illustrates a code snippet 901, which is introduced to illustrate circumstances where a predicate is learned that does not appear directly in the code. Furthermore, code snippet 901 also illustrates runtime values analyzed by modeling component 205 that correspond to intermediate variables and/or function return values instead of branch predicates. Code snippet 901 includes an integer array "array1" and an integer value assign_val that is assigned to a value taken from array1. The second line of code in code snippet 901 assigns values of 0 to every element of array1 except for element array1 [255], which is assigned a value of 1. The integer "index1" is used as an index into array1, and the corresponding value in array1 is assigned to assign_val and returned by function func1.

By substitution, the value of assign_val is 0 for all values of index1 except those values when (index1 % 256==255), e.g., 255, 511, 767, etc. As discussed above, modeling component 205 can learn a relationship between input variable x1 and runtime values such as the runtime value of the intermediate variable assign_val and/or the return value of func1. Modeling component 205 can learn the relationship between assign_val and x1 as a predicate ((x1+1) % 256==255). Because assign_val is used as a return value by func1, modeling component 205 can equivalently learn this predicate by considering runtime values returned by func1, e.g., by instrumenting another function that calls func1. Note also that this learned predicate is expressed as a function of input variable x1 that does not include intermediate variable index1.

In code snippet 901, x1 has a relatively low probability of satisfying the relationship ((x1+1) % 256==255) from uniform random test inputs. Therefore, assign_val has a relatively low probability of being assigned a value of 1, and func1 has a correspondingly low probability of returning the value 1. Accordingly, constraint solver 208 can generate values for x1 that satisfy the relationship ((x1+1) % 256==255), e.g., 254, 510, 766, etc.

Conclusion

Using the described implementations, computing programs can be analyzed using modeling techniques to discover relationships between program input variables and runtime values. The discovered relationships can be represented as learned predicates that include one or more input variables. Moreover, the learned predicates can be independent of (e.g., not include) intermediate variables. This, in turn, is useful for analyzing computer programs with complicated intermediate code paths, relationships between variables, and/or other complexities.

Although techniques, methods, devices, systems, etc., pertaining to the above implementations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method performed by at least one processing device, the method comprising:
    performing multiple executions of test code having input variables, wherein the multiple executions use different input variable values for the input variables and the test code is instrumented to record runtime values of programmatic expressions appearing in the test code during the multiple executions, wherein the test code has been instrumented by rewriting the test code to obtain an instrumented binary or by generating the instrumented binary from the test code;
    training a model using a machine learning or statistical technique that learns relationships between the runtime values of the programmatic expressions appearing in the test code and the input variables, wherein the model is trained using the machine learning or statistical technique to learn an individual relationship between an individual input variable and the runtime values of the programmatic expressions appearing in the test code; and
    representing the individual relationship between the individual input variable and the runtime values of the programmatic expressions appearing in the test code with multiple mathematical functions of the individual input variable, wherein the multiple mathematical functions used to represent the individual relationship include:
        a first mathematical function having a first independent variable representing the individual input variable and a first dependent variable representing the runtime values of the programmatic expressions appearing in the test code, and
        a second mathematical function having a second independent variable representing the individual input variable and a second dependent variable representing the runtime values of the programmatic expressions appearing in the test code.

2. The method of claim 1, wherein the multiple mathematical functions used to represent the individual relationship include a third mathematical function that does not have the individual input variable as an independent variable.

3. The method of claim 1, wherein the first mathematical function has another first independent variable representing another individual input variable and the second mathematical function has another second independent variable representing the another individual input variable.

4. The method of claim 1, wherein the programmatic expressions appearing in the test code comprise branch predicates appearing in the test code and the runtime values include branch predicate values of the branch predicates appearing in the test code.

5. The method of claim 1, wherein the programmatic expressions appearing in the test code comprise intermediate variables and the runtime values include intermediate variable values of the intermediate variables appearing in the test code.

6. The method of claim 5, wherein other values of other intermediate variables in the test code are not used to train the model to learn the individual relationship.

7. The method of claim 1, wherein the training the model does not consider different control paths taken in the test code.

8. The method of claim 1, wherein the relationships are at least partially modeled using a mixture of linear surfaces.

9. The method of claim 1, wherein the first mathematical function and the second mathematical function are discontinuous from one another.

10. A system comprising:
    one or more processing devices; and
    one or more hardware computer-readable storage media storing instructions which, when executed by the one or more processing devices, cause the one or more processing devices to:
        execute test code having a program predicate that appears in the test code, wherein the test code has been instrumented to record runtime values of the program predicate by rewriting the test code to obtain an instrumented binary or by generating the instrumented binary from the test code;
        access the runtime values of the program predicate that appears in the test code, wherein the program predicate that appears in the test code evaluates to the runtime values when the instrumented binary is executing and processing input variables;
        process the runtime values of the program predicate that appears in the test code using a machine learning or statistical technique to learn a model of relationships between the input variables and the runtime values of the program predicate that appears in the test code; and
        represent an individual relationship learned by the machine learning or statistical technique as a mathematical expression having an independent variable representing an individual input variable and a dependent variable representing the runtime values of the program predicate that appears in the test code.

11. The system of claim 10, wherein the instructions cause the one or more processing devices to:
    represent the individual relationship using multiple mathematical expressions including the mathematical expression and another mathematical expression that has another independent variable representing the individual input variable and another dependent variable representing the runtime values of the program predicate that appears in the test code; and
    identify a number of behavior modes for the program predicate that appears in the test code using the multiple mathematical expressions.

12. The system of claim 11, wherein each behavior mode is represented as a different one of the multiple mathematical expressions and at least one of the multiple mathematical expressions includes less than all of the input variables.

13. The system of claim 10, wherein the program predicate is a branch predicate that appears in the test code.

14. A system comprising:
at least one processing device; and
at least one computer-readable storage media storing instructions which, when executed by the at least one processing device, cause the at least one processing device to:
- access runtime values of an intermediate variable that appears in an executable binary, wherein the runtime values of the intermediate variable that appears in the executable binary are produced by the executable binary while executing and processing input variables and the executable binary has been instrumented to record the runtime values of the intermediate variable, wherein the executable binary has been instrumented during generation of the executable binary or by modifying the executable binary;
- process the runtime values of the intermediate variable that appears in the executable binary using a machine learning or statistical technique to learn a model of relationships between the input variables and the runtime values of the intermediate variable that appears in the executable binary; and
- represent an individual relationship learned by the machine learning or statistical technique as a mathematical expression having an independent variable representing an individual input variable and a dependent variable representing the runtime values of the intermediate variable that appears in the executable binary,
wherein the intermediate variable that appears in the executable binary is not an input variable to the executable binary.

15. The system according to claim 14, wherein the instructions cause the at least one processing device to:
instrument the executable binary so that the executable binary records the runtime values of the intermediate variable that appears in the executable binary.

16. The system according to claim 14, wherein the executable binary comprises compiled test code.

17. The system according to claim 14, wherein the executable binary comprises interpreted test code.

18. The system according to claim 14, wherein the instructions cause the at least one processing device to:
process function return values returned by a function that appears in the executable binary using the machine learning or statistical technique to learn another individual relationship between the input variables and the function return values, wherein the function return values are returned by the function when the executable binary is executing and processing the input variables; and
represent the another individual relationship learned by the machine learning or statistical technique as another mathematical expression having another independent variable representing the individual input variable and another dependent variable representing the function return values.

19. The system according to claim 14, wherein the executable binary executes remotely from the system.

20. The system according to claim 19, embodied on an analysis server.

* * * * *